April 6, 1937.    H. CHIREIX ET AL    2,076,264
PHASE AND FREQUENCY CONTROL OF OSCILLATIONS
Original Filed Jan. 8, 1932    3 Sheets-Sheet 1

INVENTORS
HENRI CHIREIX
PAUL BORIAS
BY
ATTORNEY

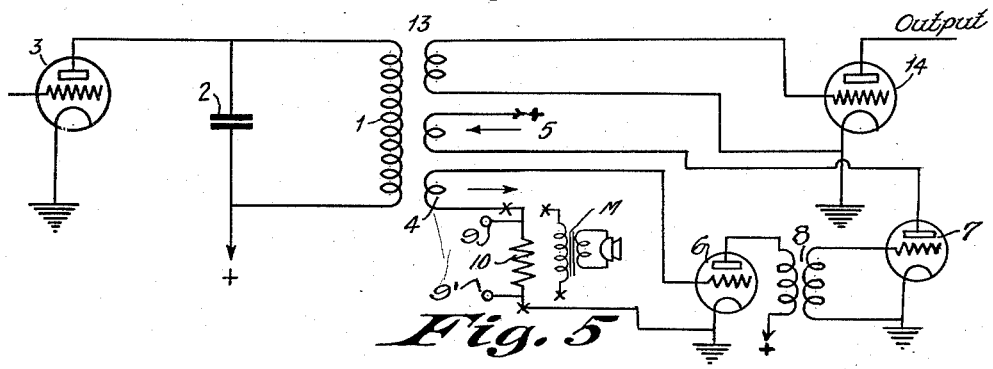
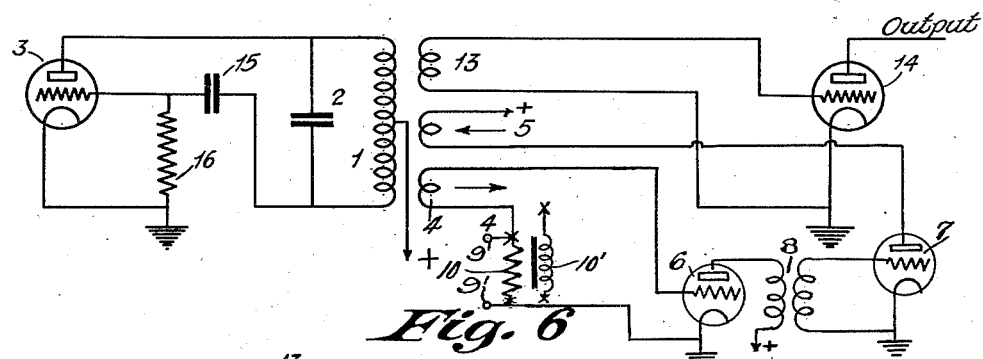
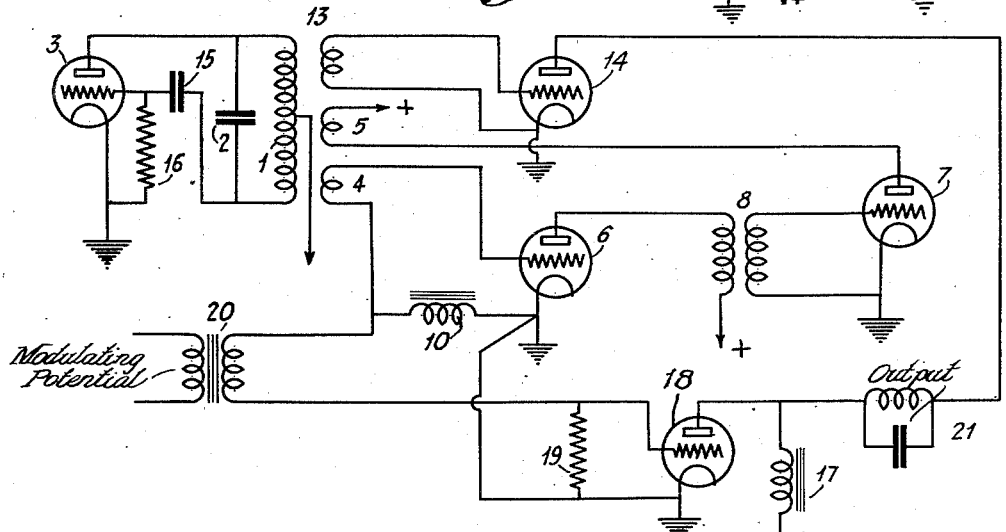

INVENTORS
HENRI CHIREIX
PAUL BORIAS
BY
ATTORNEY

Patented Apr. 6, 1937

2,076,264

UNITED STATES PATENT OFFICE 2,076,264

PHASE AND FREQUENCY CONTROL OF OSCILLATIONS

Henri Chireix and Paul Borias, Paris, France, assignors to Compagnie Generale de Telegraphie sans Fil, a corporation of France Application January 8, 1932, Serial No. 585,489.
Renewed May 17, 1935. In France January 10, 1931

33 Claims. (Cl. 179—171)

This invention relates to improvements in reaction arrangements comprising the use of multi-electrode tubes and practical applications thereof.

The present invention is predicated upon the following principle:

If reaction or regeneration is applied to a periodic circuit comprising inductance and capacitance, the result of such reaction or regeneration whenever the effect is in phase with the cause, manifests itself in the form of a decrease or an increase according to the sense, of the resistance of the circuit. If, on the contrary, the effect is in quadrature relation with the cause, the reaction will manifest itself in a decrease or an increase, according to the sense, of the reactance of the circuit.

The present invention consists in controlling the degree of the reaction by the amplitude of the current with a view to insure the following results, to wit: (1) Control or regulation of the phase angle between the periodic current and the periodic potential in an oscillation circuit, such control action being secured in the absence of inertia by a direct current, such control insuring phase modulation within the said circuit if the current regulating the reaction is itself periodical in nature, comprising one or more simultaneous frequencies. (2) Regulation of the frequency generated by a self-exciting circuit, such regulation being accomplishable in the absence of inertia by a direct current, the regulation means insuring frequency modulation if the current controlling reaction itself is periodic, comprising one or more simultaneous frequencies. (3) Practical realization of telephony system known as the carrier wave system, with a single side-band, by suppression of one modulation side-band, modulation being effected at the same time by frequency as set forth in item 2, and by amplitude in a manner well known in the prior art, so as to create a vector rotating at the resultant speed of the carrier wave and of telephone modulation. (4) Realization of constant or stabilized wave transmitters (involving the use of a standard circuit or a piezo-electric crystal), such stabilization being accomplished by making the reaction involving a phase-displacement angle dependent upon the frequency difference between the transmitter to be stabilized and the natural period of the standard circuit or crystal stabilizer.

Figure 7:
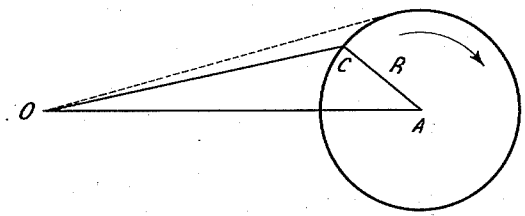
Figure 8:
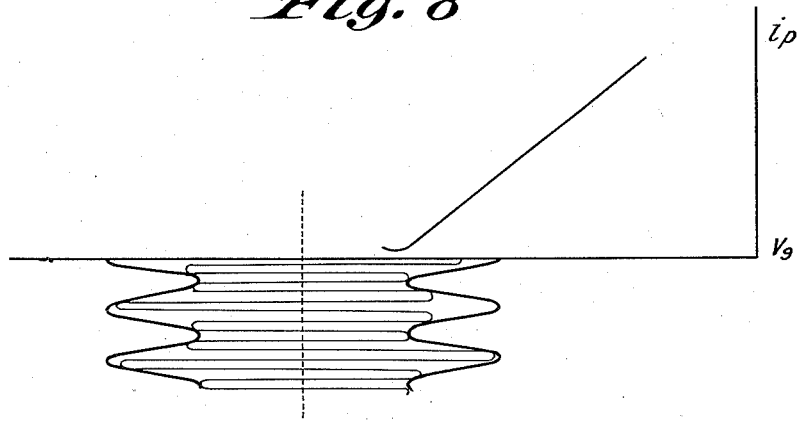

The present invention will be more clearly understood by the detailed description to be given hereinbelow by reference to the attached drawings in which Figures 1 to 6 inclusive and 9 show by way of example a number of different embodiments of the basic idea of the invention, while Figures 7 and 8 are curves which show the relation between potential and current in certain circuits.

Figure 1:
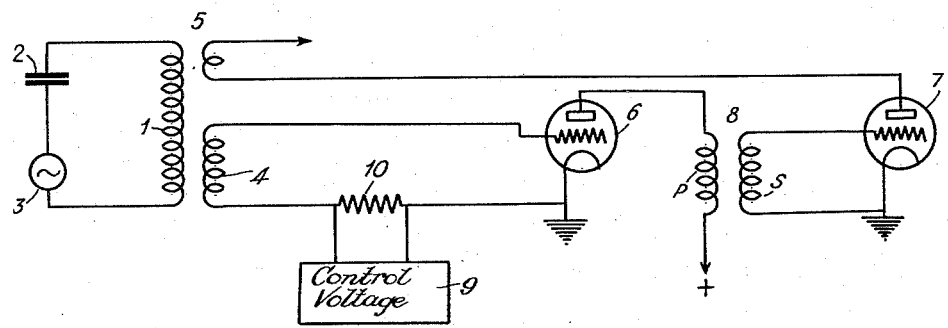

Referring to Fig. 1, I and 2 denote the constituent elements of an oscillation circuit being energized by continuous wave current from the source 3 of any desired kind, which furnishes a definite predetermined frequency. 4 denotes the coupling means with the reaction device operating on a certain phase displacement angle and comprising the thermionic tubes 6 and 7; while 5 denotes the coupling means transferring the reaction back to circuit 1, 2.

The coupling means 4 and 5 are here shown to be magnetic in nature but may be of any desired type. The triode tube 6 works upon a reactance having a low value compared with the internal resistance of tube 6. This reactance is here constituted by the primary P of a transformer 8 whose secondary S is coupled with the input elements of tube 7, it being understood that in this case different forms of coupling may be used. For example, the coupling relationship with tube 7 may be effected by the aid of resistance, or inductance, connected through a coupling capacity with the grid of tube 7. Finally, the reactance upon which the tube 6 works may be negative, i. e., constituted by a capacity by providing means for draining the direct current of tube 6 by means of a resistance or choke-coil. The important point is that, with reactive couplings, the load of tube 6 should be reactive and of low value. Under these conditions, the amplification of the tube 6 may be controlled, for instance, by making the grid more or less negative by the control current flowing through resistance 10 from a source at 9.

Figure 2:
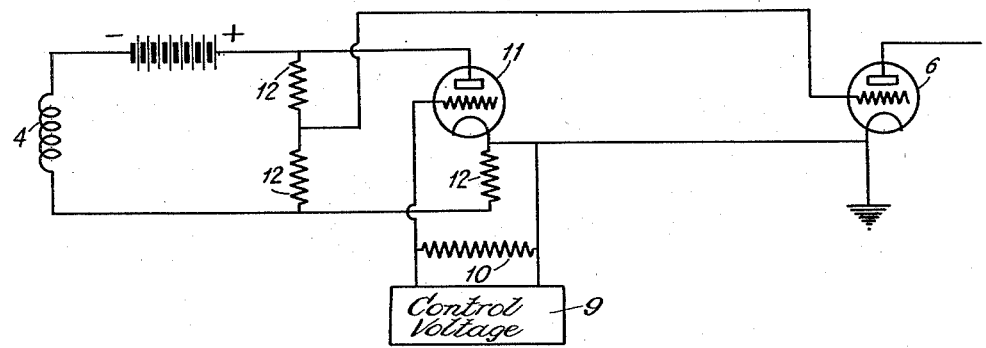

There are other means to control the gain; for instance, 6 may be a screen-grid tube in which the screen potential may be regulated, or else recourse may be had to bridge arrangements of the kind as shown, in Fig. 2 comprising a supplementary tube 11 the anode to cathode impedance of which constitutes one arm of a Wheatstone bridge in which the other three arms are constituted by resistances 12 as shown. In this case the control current may be applied to this supplementary tube through resistance 10 from source 9. In this case it will be noticed that the sense of the reaction changes as the point of balance of the bridge is passed.

At all events, what is realized is the condition that the exciting potential of the tube 6, after amplification and phase shift, is returned to the circuit 1, 2, and in the light of what has been pointed out above, the result simply is a modification of the apparent reactance of the circuit. More particularly speaking, after the tubes 6 and 7 have been extinguished, if then the natural period of oscillation of the circuit 1, 2 coincides with that of the source 3, this situation is changed as soon as these tubes are lit up, and when the phase angle between the current and the electromotive force, which, in this instance, had been assumed to be of zero value when the tubes were extinct, differs from zero, whence the result hereinbefore indicated.

Figure 3:
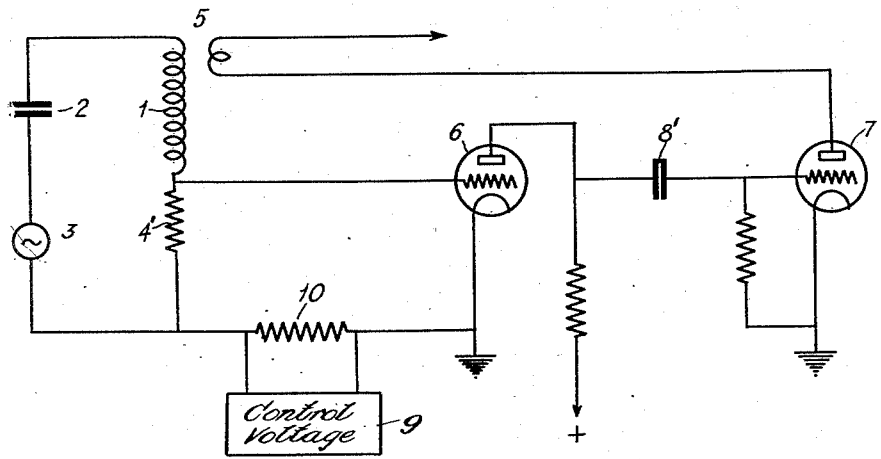

It will be understood by the man trained in the art that Fig. 3 is still equivalent to Fig. 1 although the reactance 8 of Fig. 1 has been replaced by a reactance 8' which "compensates" the fact that the excitation of the grid of tube 6 being in shunt relation to the resistance 4' is here in quadrature compared with what it was in the case of the scheme illustrated in Fig. 1.

Fig. 3 is given by way of example in order to demonstrate how many different modifications are conceivable, and to show that in all cases the desired effect is a phase displacement of $\pi/2$, or roughly so, between the potential returned to the circuit compared with the potential derived therefrom, this scheme being in fundamental opposition to the usual regeneration which requires equality or coincidence in the phase of the two potentials. The energy produced in the oscillation circuits 1 and 2 of Figures 1, 2, and 3 may be supplied from said circuit to any utilization means.

According to the modified scheme shown in Fig. 4 the circuit 1, 2, is the tuned output circuit of a radio frequency amplifier stage where the tube 3' plays the part of generating means 3 in the preceding illustrations. Coupling this stage, for instance, as shown at 13 with a second stage of amplification indicated by the tube 14, the insertion indicated by the couplings 4 and 5 of the tubes 6 and 7 and of their circuits, arranged as hereinbefore described in connection with Figs. 1 to 3 or in an equivalent manner, makes it possible to vary the phase between two stages of amplification. More particularly, if resistance 10 of the preceding illustrations is passed by a telephone current, tube 14 will be excited by a radio frequency wave modulated in phase coincidence. In this instance, the percentage of phase modulation, that is to say, the phase displacement angle will depend upon the intensity of the current flowing through the resistance 10 which may then be disconnected at points X and be replaced by the transformer M if telephone current is used for modulation and will be independent of the modulation frequency. This realizes the first object of the invention i. e., phase modulation.

According to the modification shown in Fig. 5 tube 3 is made self-generative, for instance, by the addition of the capacity 15 and the resistance 16, this arrangement being cited merely by way of example and being by no means to be taken as limiting the scope of the invention for the effect and result would be the same with the use of any other self-generation scheme. The effect obtained by the tubes 6 and 7 of Figure 5 will be frequency modulation. This, however, under certain conditions will be equivalent to phase modulation, as will be readily understood from what follows:

If the radio frequency pulsation ($\omega$) varies between ($\omega+\Delta\omega$) and ($\omega-\Delta\omega$) in accordance with a sine law, at a frequency corresponding to the pulsation of lower value $\Omega$, the instantaneous pulsation will be of this form: $\omega+\Delta\omega \cos \Omega t$.

After time $t$ the angle has been passed through will be:

1. $\int_0^t (\omega+\Delta\omega \cos \Omega t) dt = \omega t + \frac{\Delta\omega}{\Omega} \sin \Omega t$ and the radio frequency wave has the form $$A \cos (\omega t + \frac{\Delta\omega}{\Omega} \sin \Omega t)$$

If $\Delta\omega$ is low or $\Omega$ high, and if $$\frac{\Delta\omega}{\Omega} = \varphi$$

and $$\varphi < \pi/2$$

it will as a matter of fact be seen that the frequency modulation manifests itself by a change in phase, though, contrary to what had been true in the preceding case the shift in the phase angle is so much lower or smaller the higher the value of $\Omega$, in other words, the higher the frequency of the telephone currents. In order to restore independence between the rate of modulation and the frequency of modulation, an inductance coil 10' is substituted for the resistance 10 by disconnecting the latter at points X and connecting 10' to said points, and the maximum phase displacement angle is attained at the instant when the modulating current passes through zero value. In this way the second object of the invention is realized.

But this object e. g., frequency modulation, is capable of several applications which also fall inside the scope of this invention, to wit: (a) By using as the controlling current a direct current impressed through the resistance 10 there is obtained a generator of variable frequency which, for instance, may be used in telegraphy work in connection with a code wherein the various letters are characterized by different frequencies as disclosed in French Patent #673,324. (b) The control current is a variable current, but the rate of variation is sufficiently slow so that $$\varphi >> \pi/2$$

in other words, so that the frequency variations may effectively become manifest. 10 may then be a resistance. (c) The control current is a telephone current and the assembly is used in connection with radio frequency energy under conditions where $$\varphi << \pi/2$$

In this manner modulation by virtue of phase shift is realized, and this could be combined with amplitude modulation as shall hereinafter be explained in more detail.

According to the scheme illustrated in Fig. 6 or equivalent arrangement the plate potential of amplifier tube 14 is modulated in an arrangement known as a plate-control scheme by the aid of a potential derived across the terminals of the inductance 17, said potential being developed by the modulator tube 18 the input circuit of which in turn is excited by a potential obtained across the terminals of a resistance 19 in series with the inductance 10' and the secondary of transformer 20 through which the telephone currents are caused to flow. The amplitude modulation potential will be phase-displaced by an angle of $\pi/2$ or practically so in reference to the phase modulation potential obtained across the terminals of 10'. The radio frequency current obtained in the output tank circuit 21 thus will be modulated both in phase and in amplitude.

It will have this form:

2. $A \cos(\omega t \pm \varphi \sin \Omega t)(1 + k \cos \Omega t)$ or by confining to the first terms of the series:

$A (\cos \omega t \pm \varphi \sin \omega t \sin \Omega t + k \cos \omega t \cos \Omega t)$ or if $k = \varphi$ $A \cos \omega t + A K \cos (w \pm \Omega) t$ according to the sense of connection of the inductance coil 10'.

This formula is correct only as long as K and $\varphi$ are both fairly small. The result is that, as shown by the calculation, one of the side-bands due to the modulation has disappeared.

It is to be noted that equality of $\varphi$ and K is insured no matter what the frequency once it has been secured for one frequency, in view of the fact that $\varphi$ is only constant with the frequency if the modulating potential is derived across the terminals of an inductance coil.

Such two-fold modulation may be represented graphically in a way as shown in Fig. 7 where OA represents the vector A and where $R = K$ OA. The complete suppression of one side-band presupposes that the end C of the vector OC is shifted along a circumference having A as its center.

On the other hand, in order that there may arise no deformation or distortion it is necessary that the amplitude OC to which the receiver is responsive, should grow and decrease sinusoidally with the time, provided the modulating frequency itself is sinusoidal.

It is easy to see that this two-fold condition is only realized if the percentage or degree of modulation becomes very low. Indeed in this case the vector OC becomes tangent to the circle when OC passes through the value OA. However if this is not true, but if OC varies sinusoidally in amplitude with the time for a modulation which itself is sinusoidal, which is a fact for the arrangement shown by way of example, no distortion will arise, but the extinction or suppression of one of the side-bands will be incomplete. At all events, interference will be greatly diminished.

Fig. 8 shows in what way, in radio frequency amplification, it is possible to transform a wave that is but little modulated into a markedly modulated wave. This Fig. 8 shows the characteristic curve between the plate current as function of the grid potential, and it will be noted that, if the grid is given a negative bias so as to attain zero plate current by action of modulation, the wave in the output circuit may be practically modulated at 100%. Which goes to show that even if the degree of modulation is low in the circuit 21, it is nevertheless feasible to insure a high-percentage modulation in the following stages.

It will be evident that also the scheme in Fig. 6 is capable of the adoption of various modifications. What is essential is that the amplitude modulation should take place in the presence of a phase displacement angle of 180 degrees relative to the phase modulation, though this necessity, as to the rest, will become apparent from the fact that the amplitude modulation potential should be derived across the terminals of a resistance, whereas the phase modulation potential is derived across the terminals of an inductance coil. What precedes discloses the ways and means of carrying into practice the third object of the invention.

Figure 9:
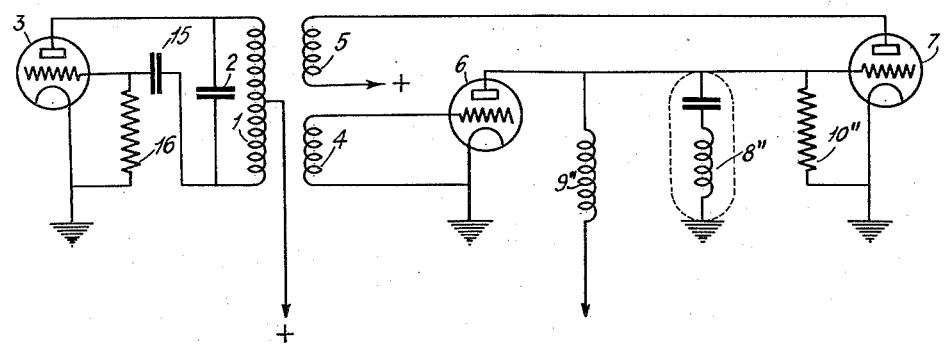

The arrangement in Fig. 9 indicated by way of example for the stabilization of a transmitter will be readily comprehended in the light of what precedes. All that is necessary is to remove the control means 10 of Figure 1 and to replace the transformer 8 in Fig. 1 by the circuit 8" as shown in Fig. 9. The circuit 8" is tuned to the mean frequency of the wave to be transmitted. Means 9" is provided for the flow of direct current to the anode of tube 6 and resistance 10" is provided for fixing the grid potential of the tube 7. As a matter of fact it will be seen that the sense of the phase-displaced reaction being of zero value in the presence of tuned condition, is caused to change when passing through the latter. In the presence of a favorable sense of the coupling 4 or 5 there is a tendency to counteract all variation in the frequency produced by the tube 3 and the circuits shown associated therewith. The additional reactance produced in 1, 2 due to the quadrature reaction 4, 6, 7, and 5 is zero in the presence of resonance between the frequency generated in the oscillation generator 3 and its associated circuits and the frequency of the master oscillating or frequency determining circuit 8". This is because at resonance 8" is a short-circuit for the generated frequency. This reactance, effective in 1, 2, becomes positive or negative according to the direction of deviation of the said frequency of the generator from the resonance frequency of 8". With proper relative polarity of the coupling coils 4, 5 conditions are made such that this variation of the reactance due to the phase displaced feedback will act to correct the frequency of the generated wave and restore the said frequency to the value determined by the control circuit 8". That is, if the frequency of 3 varies above the desired value, element 8" acts as an inductive reactance and the effective inductance of inductance 1 is increased by the feedback which tends to reduce the frequency of the generated oscillations. If the frequency decreases 8" acts as a capacity and the inductance of 1 is lessened. Calculation, indeed, goes to show that with this scheme the circuit 1, 2, appears to have greatly increased reactances derived from circuit 8". This latter circuit plays the part of a master oscillator circuit of standard frequency, and it may therefore be calibrated as such. More in detail, this circuit may include a piezo-electric quartz crystal, it being understood that the same thing equally applies to the other circuit schemes, and the single stage 7 may be replaced by a plurality of cascade-connected stages.

We claim:

1. An electric arrangement comprising, an oscillation circuit traversed by an alternating current, a second circuit for deriving current from said oscillation circuit and amplifying the derived current, means for varying the amplification of said derived current comprising a system of electric control using variations of potential applied to the said amplifying circuit, and means to return the energy amplified to the oscillation circuit in phase quadrature relative to the alternating current in the oscillation circuit.

2. An electric arrangement comprising, an oscillation circuit traversed by alternating current and means for varying the phase of said current, said means including a circuit for selecting and amplifying a part of the current of the oscillation circuit by the aid of at least one thermionic tube containing electrodes, a source of voltage of fixed frequency and an amplitude variable at the rhythm of the desired phase variation, the voltage of said source controlling the potential applied to an electrode of the said tube to insure variation of the amplification of said selected current, and means for impressing the amplified current on the oscillation circuit in phase quadrature with respect to the current existing in the oscillation circuit.

3. An electric arrangement comprising, an oscillation circuit forming part of a regeneratively coupled wave generator circuit and means to vary the frequency of the wave produced by the said generator including a circuit to draw energy from the oscillation circuit and amplify the energy so drawn, means to vary the amplification imparted to the said energy at the rhythm of the desired frequency variation by an inertialess electrical control system, and means for re-introducing the said variably amplified energy in the oscillation circuit in phase quadrature with the energy existing in said oscillation circuit.

4. An electric arrangement comprising an oscillation circuit traversed by alternating current, a circuit for selecting a portion of current from said circuit and to amplify the selected current by the aid of at least one thermionic tube containing electrodes and circuits interconnecting said electrodes, an impedance inserted in one of said interconnecting circuits, means to control the amplification characteristic of said circuit and tube comprising a source of control potential, means for impressing said control potential across the terminals of said impedance, and means for re-introducing the variably amplified current in the oscillation circuit in phase quadrature with the current existing therein.

5. Modulating means comprising, an oscillation circuit traversed by alternating current to be modulated, a circuit for separating current from said oscillation circuit and amplifying the separated current in this circuit by the aid of at least one thermionic tube having a plurality of electrodes and circuits interconnecting said electrodes, an ohmic resistance inserted in the circuit to one electrode of said tube, means for controlling the amplification characteristic of said tube comprising a source of control potential connected across the terminals of said ohmic resistance, and a circuit for re-introducing the separated amplified energy into the oscillation circuit in phase quadrature with the energy existing in said oscillation circuit.

6. An electric arrangement comprising, an oscillation circuit traversed by alternating current, means to transfer energy from said circuit to a thermionic tube comprising a plurality of electrodes and interconnecting circuits for amplifying said transferred current, an inductance inserted in the circuit connected with one electrode of said tube, means for controlling the amplification characteristic of said tube including a source of control potential connected across the terminals of said inductance, and means for impressing the amplified energy into the oscillation circuit in phase quadrature with the energy existing in said oscillation circuit.

7. An electric arrangement comprising, an oscillation circuit traversed by alternating current and means for phase modulation of the said current comprising, a circuit for separating energy from the oscillation circuit and amplifying the separated energy by means of a thermionic tube having a plurality of electrodes and interconnecting circuits, a source of periodic potential of fixed frequency corresponding to the rhythm of the desired phase variation, the potential of the said source controlling the voltage applied to an electrode of the said tube to insure variations in the amplification characteristic of said tube, and means for impressing the amplified energy on the oscillation circuit in phase quadrature with the energy existing in said circuit.

8. An electric arrangement comprising, an oscillation circuit forming part of an auto-generator circuit and means to regulate the value of the frequency produced in the generator, these means comprising means for selecting and amplifying part of the energy of the oscillation circuit by the aid of at least one tube comprising a plurality of electrodes, an ohmic resistanc inserted in the circuit of an electrode of the said tube, a source of direct current voltage applied across the terminals of the said resistance, means for regulating the said voltage whereby the gain is controlled, and means for re-introducing the amplified energy in the oscillation circuit in phase quadrature with the energy existing in the latter.

9. Frequency changing means comprising, an oscillation circuit forming part of a thermionic generator circuit of the self-generation type, and means for varying the frequency produced by the generator including, a circuit coupled to said oscillation circuit to draw energy therefrom and to amplify said energy by the aid of at least one thermionic tube having a plurality of electrodes and circuits connecting said electrodes, an ohmic resistance inserted in the circuit of one of said electrodes, a source of potential, the characteristic of which varies slowly, connected across the terminals of said ohmic resistance, and a circuit for impressing the amplified energy on the oscillation circuit in phase quadrature with the current therein, whereby the slow variations of the control potential are converted into corresponding variations of the frequency of the current in the generator oscillation circuit.

10. An electric arrangement comprising, an oscillation circuit forming part of an auto-generator circuit, and means to modulate the frequency of the currents generated comprising, a circuit for separating and amplifying the energy from the oscillation circuit by the aid of at least one tube having a plurality of electrodes and circuits interconnecting said electrodes, an inductance inserted in the circuit of one of the electrodes of said tube, a source of periodic potential applied across the terminals of said inductance to control the amplification of said tube, and means for re-introducing the amplified energy into the oscillation circuit in phase quadrature with the energy existing in the latter.

11. An electric arrangement to be used with an oscillation circuit traversed by alternating current for simultaneously applying amplitude and phase modulation to said current and suppressing a side band in the spectrum of frequencies obtained by such modulation including, amplifying means comprising a circuit coupled to said oscillation circuit to derive energy therefrom and amplify the derived energy by means of at least one thermionic tube having a plurality of electrodes and circuits interconnecting said electrodes, an inductance inserted in the circuit of one of said electrodes, a source of periodic modulating potential connected across the terminals of said inductance to control the amplification factor of said tube and means to control by the said periodic potential the amplitude of the output current of the said amplifying means, and means for reintroducing the amplified energy in the oscillation circuit in phase quadrature with the energy existing in the latter.

12. An electric arrangement comprising, an oscillation circuit traversed by an alternating current, means to separate energy from said circuit and amplify the separated energy comprising a plurality of tubes connected in cascade, a coupling element between certain of said tubes comprising a frequency determining circuit resonant at the mean frequency of said alternating current, and a circuit to re-introduce the amplified energy in the said first oscillation circuit in phase quadrature with the energy existing in the said oscillation circuit, said circuit including a coupling of definite sense so as to insure a variation in reactance of said oscillation circuit tending to counteract the departures of the frequency of the current in reference to the frequency of the said resonant frequency determining circuit.

13. Means for producing and phase modulating high frequency oscillations comprising, a thermionic tube having anode, cathode and control grid electrodes regeneratively connected by an oscillation circuit in which the oscillations produced flow, a thermionic amplifier having an anode, a cathode and a control grid, a circuit connected between said grid and said cathode of said amplifier, means for coupling said last named circuit to said oscillation circuit, an impedance connected with the control grid in said last named tube, means for varying the value of said impedance at signal frequency, an output circuit connected with the anode of said last named tube, and means for transferring energy from said output circuit to said oscillation circuit.

14. An oscillation circuit in which alternating current flows, means for modulating said alternating current in phase at signal frequency comprising, a thermionic tube having its control grid coupled to its cathode by way of an impedance, a coupling between the control grid of said last named tube and said oscillation circuit, a second thermionic tube having its control grid coupled to the anode of said first named tube and its anode coupled to said oscillation circuit and to a utilization circuit, and means for varying the impedance in the control grid cathode circuit of said first named tube at signal frequency.

15. Means for producing high frequency oscillations and for modulating the same as to phase and amplitude comprising, a thermionic tube having its anode and cathode coupled together by way of an oscillation circuit, a second thermionic tube having its control grid connected to its cathode by way of a reactance, means for coupling the control grid of said second named tube to said oscillation circuit, means for coupling the anode of said second named thermionic tube to said oscillation circuit, a third thermionic tube having its cathode connected to the cathode of said second named thermionic tube and its anode coupled to a utilization circuit which is in turn coupled to said oscillation circuit, an impedance connected between the control grid and cathode of said third named tube and means for applying signal potentials in phase displaced relation to the control grids of said second and third named tubes.

16. In an electrical signalling system comprising, a resonant circuit traversed by a high frequency alternating current and means for varying the phase of said current, said means including a selecting circuit for selecting a part of the current of the resonant circuit, a source of voltage of fixed frequency and an amplitude variable at the rhythm of the desired phase variation, said source being coupled to said selecting circuit whereby the voltage of said source controls the impedance of said selecting circuit to the selected current, and means for impressing the selected current from said selecting circuit on the resonant circuit in phase displaced relation with respect to the original current existing in the oscillation circuit.

17. A frequency modulation system comprising an oscillator tube having its electrodes coupled in an oscillation producing circuit in which the produced oscillations flow, an additional tube having a control electrode and an output electrode, a coupling between the control electrode of said additional tube and said oscillation circuit whereby said control electrode of said additional tube is excited by the oscillatory energy in said oscillation circuit, a coupling between the output electrode of said additional tube and said oscillation circuit whereby voltages on the output electrode of said additional tube are impressed on said oscillatory circuit, said coupling means including means for producing substantially a 90° phase relation between the voltage impressed from said oscillatory circuit on said control electrode and the voltage impressed from said output electrode on said oscillatory circuit, a source of modulating potentials, and a circuit coupling said source of modulating potentials to one of the electrodes in said additional tube to vary the impedance of said tube at the frequency of the modulating potentials whereby the reactance of the oscillation circuit is controlled in accordance with said modulating potentials.

18. In a signalling system, an electrical circuit including inductance and capacity through which alternating current of the frequency to which said circuit is resonant may flow, a thermionic tube having a control electrode and an output electrode, a circuit coupling said control electrode to said resonant circuit to energize said control electrode by alternating current energy drawn from said resonant circuit, a circuit coupling said output electrode to said resonant circuit to supply alternating current energy thereto of a phase which is displaced with respect to the phase of the original alternating current energy therein, and means coupled to one of the electrodes in said tube to alter the impedance thereof in accordance with signalling potentials.

19. A frequency modulation system comprising an oscillator having a frequency determining circuit in which oscillations are produced by said oscillator, supplementary means fed by said oscillator for feeding back oscillations relatively shifted in phase substantially 90° with respect to the oscillations of said oscillator to said frequency determining circuit, and means responsive to signalling waves for varying the amplitude of the oscillations fed from said supplemental means to said frequency determining circuit to vary the frequency of the oscillations produced in said frequency determining circuit by said oscillator.

20. In a frequency modulating system an oscillation generator having a frequency controlling circuit, a reactive element associated with said frequency controlling circuit to determine in part the tune thereof, a phase shifting circuit for feeding voltages from said frequency controlling circuit to said reactive element, and an impedance in said circuit responsive to signalling potentials for varying the amplitude of the voltages fed from said frequency controlling circuit to said phase shifting circuit and from said phase shifting circuit to said reactive element whereby the effective reactance of said frequency controlling circuit is varied to thereby vary the frequency of the oscillatory energy appearing in the said circuit in accordance with said signalling potentials.

21. In a frequency modulating system, an oscillation generator having a frequency controlling circuit, a reactive element associated with said frequency controlling circuit to determine in part the tune thereof, additional circuit means for feeding voltages from said frequency controlling circuit to said reactive element and for shifting the phase of the voltages fed to said reactive circuit relative to the phase of the oscillations of said generator, and means in said additional circuit means responsive to signal waves for varying the amplitude of the voltages fed by said additional circuit to said reactive element, said last named means being responsive in different manners to different signal wave frequencies whereby the effective reactance of said frequency controlling circuit is varied to vary the frequency of the oscillatory energy appearing in said circuit.

22. An arrangement as recited in claim 20 in which said reactive element is an inductance coupled to said frequency controlling circuit.

23. An arrangement as recited in claim 19 wherein said supplementary means is a circuit coupled at its input to said frequency determining circuit and at its output to the electrodes of a thermionic tube, the output of which is coupled to said frequency determining circuit, and in which said third named means is a circuit for applying signalling potentials to the impedance of said tube in said supplementary means.

24. An arrangement as recited in claim 28 in which said phase shifting circuit includes a thermionic tube coupled at its input to said frequency controlling circuit and at its output to said reactive element, and in which said impedance is connected to the input electrodes of said tube and to a source of signal potentials for applying signal potentials to the impedance of said thermionic tube.

25. A phase modulation system comprising a tube having a high frequency circuit in which high frequency wave energy is caused to flow, means including a resistance for diverting high frequency wave energy from said circuit and returning the diverted energy to said circuit in phase displaced relation, and means responsive to modulating potentials for causing a variable current flow through said resistance, thereby varying the amplitude of energy returned to said circuit, to produce in said circuit a phase modulated wave.

26. A frequency modulation system comprising a thermionic oscillator having an oscillation circuit coupled thereto, means including a resistance for diverting energy from said oscillation circuit and returning the diverted energy to said oscillation circuit in phase displaced relation, and means responsive to modulating potentials for causing a variable current flow through said resistance, thereby varying the amplitude of the energy returned to said oscillation circuit to produce in said circuit a frequency modulated wave.

27. A modulation system comprising a first tube having input and output electrodes connected in oscillation producing circuits, a translating circuit including a second tube, said translating circuit having an input and an output, means for impressing on said input a voltage derived from said oscillation circuit, means for feeding back into said oscillation circuit from said output a voltage displaced substantially 90° relative to the voltage of the oscillations produced in said oscillation circuit, and means for varying the gain of said second tube in accordance with voltages derived from signals whereby the oscillations produced in said oscillation circuit are modulated.

28. In an electrical signalling system, an oscillator, a resonant circuit coupled to said oscillator and traversed by the high frequency alternating current produced by said oscillator and means for varying the phase of said current, said means including a second circuit for diverting current from said oscillator, a source of control voltage being coupled to said second circuit whereby the voltage of said source controls the impedance of said second circuit to the diverted current, and a third circuit for impressing the diverted current from said second circuit on said resonant circuit in phase displaced relation with respect to the original current existing in the first circuit.

29. An electrical signaling system comprising a resonant circuit traversed by alternating current, a thermionic tube having a control electrode and an output electrode, a second circuit coupling the control electrode of said tube to said resonant circuit, a third circuit coupling the output electrode of said tube to said resonant circuit, phase shifting means in said third circuit, a source of modulating potentials, and a circuit coupling said source of modulating potentials to one of the electrodes in said tube to vary the impedance of said tube at the frequency of the modulating potentials.

30. In a constant frequency oscillation producer, a source of oscillations of a frequency which may tend to vary, said source including a resonant circuit, means for holding the frequency of said source substantially constant comprising a supplementary circuit coupled at its input to said source to divert voltage therefrom and at its output to said resonant circuit to impress voltage thereon substantially 90° relative to the voltage of said source, and a circuit series tuned to the frequency of the oscillation to be produced in shunt to said supplementary circuit whereby deviations in frequency of the oscillations of said source act through said supplementary circuit and series tuned circuit to produce reactive effects in said resonant circuit which oppose said deviations in frequency.

31. In a frequency modulation system an oscillator connected with a frequency determining circuit in which oscillations are generated, a supplementary circuit coupled to said oscillator for feeding oscillations therefrom back to said frequency determining circuit, phase shifting means in said supplementary circuit for shifting the phase of the oscillations fed back substantially 90° relative to the phase of the generated oscillations, and a resistance connected with said supplementary circuit and to a source of modulating potentials for varying the amplitude of the oscillations fed back by said supplementary circuit to said frequency determining circuit, to thereby vary the frequency of the oscillations generated in said frequency determining circuit by said oscillator.

32. In a frequency modulation system, an oscillator connected with a resonant reactive circuit to produce in said circuit oscillating currents, a supplementary circuit coupled to said resonant reactive circuit to divert oscillations therefrom, means coupled to said supplementary circuit and to said resonant circuit for feeding said diverted oscillations back to said resonant circuit in substantially 90° phase displaced relation, a source of modulating potentials, and a reactor coupled with said source of modulating potentials and with said supplementary circuit for varying the amplitude of the oscillations fed by said supplementary circuit to said reactive circuit to thereby vary the frequency of the oscillations produced in said reactive circuit, said reactor being responsive in different degrees to the different frequencies of said modulating potentials.

33. In a system for producing oscillations and modulating the same in phase and amplitude in accordance with signal potentials, an oscillation generator including a resonant circuit, a thermionic tube having a control grid, a cathode and an anode, a source of modulating potentials, a high frequency reactance coupling the control grid and cathode of said tube to said resonant circuit, a low frequency reactance coupling the control grid and cathode of said tube to said source of modulating potentials, a circuit including a phase shifting means coupling the anode and cathode of said tube to said resonant circuit, an additional thermionic tube having a control grid, a cathode and an anode, a high frequency circuit coupling the control grid and cathode of said additional tube to said resonant circuit, an output circuit connected with the anode of said additional tube, and resistive means coupling said source of modulating potentials to said output circuit.

HENRI CHIREIX.
PAUL BORIAS.